US009631661B2

(12) United States Patent
Vivier et al.

(10) Patent No.: US 9,631,661 B2
(45) Date of Patent: Apr. 25, 2017

(54) EXPANSION ANCHOR

(71) Applicant: SAINT-GOBAIN PLACO, Suresnes (FR)

(72) Inventors: Guillaume Vivier, Bagneux (FR); Hugues Obame Obame, Nogent sur Oise (FR)

(73) Assignee: SAINT-GOBAIN PLACO, Suresnes (FR)

( * ) Notice: Subject to any disclaimer, the term of this patent is extended or adjusted under 35 U.S.C. 154(b) by 78 days.

(21) Appl. No.: 14/411,158

(22) PCT Filed: Jun. 26, 2013

(86) PCT No.: PCT/FR2013/051496
§ 371 (c)(1),
(2) Date: Dec. 24, 2014

(87) PCT Pub. No.: WO2014/001721
PCT Pub. Date: Jan. 3, 2014

(65) Prior Publication Data
US 2015/0233409 A1  Aug. 20, 2015

(30) Foreign Application Priority Data
Jun. 28, 2012  (FR) ................................ 12 56150

(51) Int. Cl.
*F16B 13/04* (2006.01)
*F16B 29/00* (2006.01)
*E04B 1/38* (2006.01)

(52) U.S. Cl.
CPC ................ *F16B 29/00* (2013.01); *E04B 1/38* (2013.01)

(58) Field of Classification Search
CPC ...... F16B 13/04; F16B 13/045; F16B 13/061; F16B 19/1072; F16B 29/00; F16B 37/067; E04B 1/38
(Continued)

(56) References Cited

U.S. PATENT DOCUMENTS 2,236,079 A * 3/1941 Wipper ................. F16B 13/061
411/38
2,409,702 A * 10/1946 Luce ..................... F16B 37/043
411/38
(Continued)

FOREIGN PATENT DOCUMENTS

GB            704510         2/1954

OTHER PUBLICATIONS

International Search Report issued Oct. 24, 2013, in PCT/FR2013/051496, filed Jun. 26, 2013.

*Primary Examiner* — Roberta Delisle
(74) *Attorney, Agent, or Firm* — Oblon, McClelland, Maier & Neustadt, L.L.P.

(57) ABSTRACT

An expansion anchor includes a screw and an anchor body configured to receive a shank of the screw, the anchor body including: a flange configured to be directed towards the screw head; a nut-forming portion configured to cooperate with the screw thread; and a deformable expansion portion between the flange and the nut-forming portion. The nut-forming portion is configured to advance in the direction of the flange, by deforming the expansion portion to a deployed state, by screwing the screw in the nut-forming portion. When the anchor is mounted inside a hole in a wall, with the flange bearing against a first face of the wall, the expansion portion in the deployed state forms a continuous contact surface facing a second face of the wall and has a load-bearing section, transversely with respect to the screw axis, (Continued)

which is generally decreasing from the contact surface towards the nut-forming portion.

19 Claims, 13 Drawing Sheets

(58) Field of Classification Search
 USPC .................................................. 411/34, 38
 See application file for complete search history.

(56) References Cited

U.S. PATENT DOCUMENTS

| | | | | |
|---|---|---|---|---|
| 2,918,841 A | | 12/1959 | Poupitch | |
| 3,014,563 A | * | 12/1961 | Bratton | F16B 5/0258 |
| | | | | 403/167 |
| 3,017,800 A | | 1/1962 | Cohen | |
| 3,071,399 A | * | 1/1963 | Cronin | F16B 17/004 |
| | | | | 211/182 |
| 3,505,921 A | * | 4/1970 | Wigam | F16B 37/067 |
| | | | | 411/34 |
| 3,834,270 A | * | 9/1974 | Triplett | F16B 13/061 |
| | | | | 411/38 |
| 3,888,156 A | * | 6/1975 | Fima | F16B 13/061 |
| | | | | 411/38 |
| 4,269,106 A | * | 5/1981 | Leibhard | F16B 13/061 |
| | | | | 411/34 |
| 4,309,136 A | * | 1/1982 | Talan | F16B 13/061 |
| | | | | 411/34 |
| 4,563,118 A | * | 1/1986 | Liljedahl | F16B 29/00 |
| | | | | 411/34 |
| 4,617,692 A | | 10/1986 | Bond et al. | |
| 4,657,456 A | * | 4/1987 | Anquetin | F16B 13/061 |
| | | | | 411/38 |
| 5,496,140 A | * | 3/1996 | Gossmann | F16B 19/1054 |
| | | | | 411/34 |
| 6,273,655 B1 | * | 8/2001 | McAlpine | F16B 13/0841 |
| | | | | 411/34 |
| 6,602,034 B2 | * | 8/2003 | Wakai | F16B 13/061 |
| | | | | 411/37 |
| 6,609,866 B2 | * | 8/2003 | Huang | F16B 13/001 |
| | | | | 411/30 |
| 6,746,191 B2 | * | 6/2004 | Edland | F16B 13/0808 |
| | | | | 411/34 |
| 6,905,295 B2 | * | 6/2005 | Stevenson | F16B 11/006 |
| | | | | 411/34 |
| 2004/0247412 A1 | * | 12/2004 | Reck | B21J 15/048 |
| | | | | 411/386 |

* cited by examiner

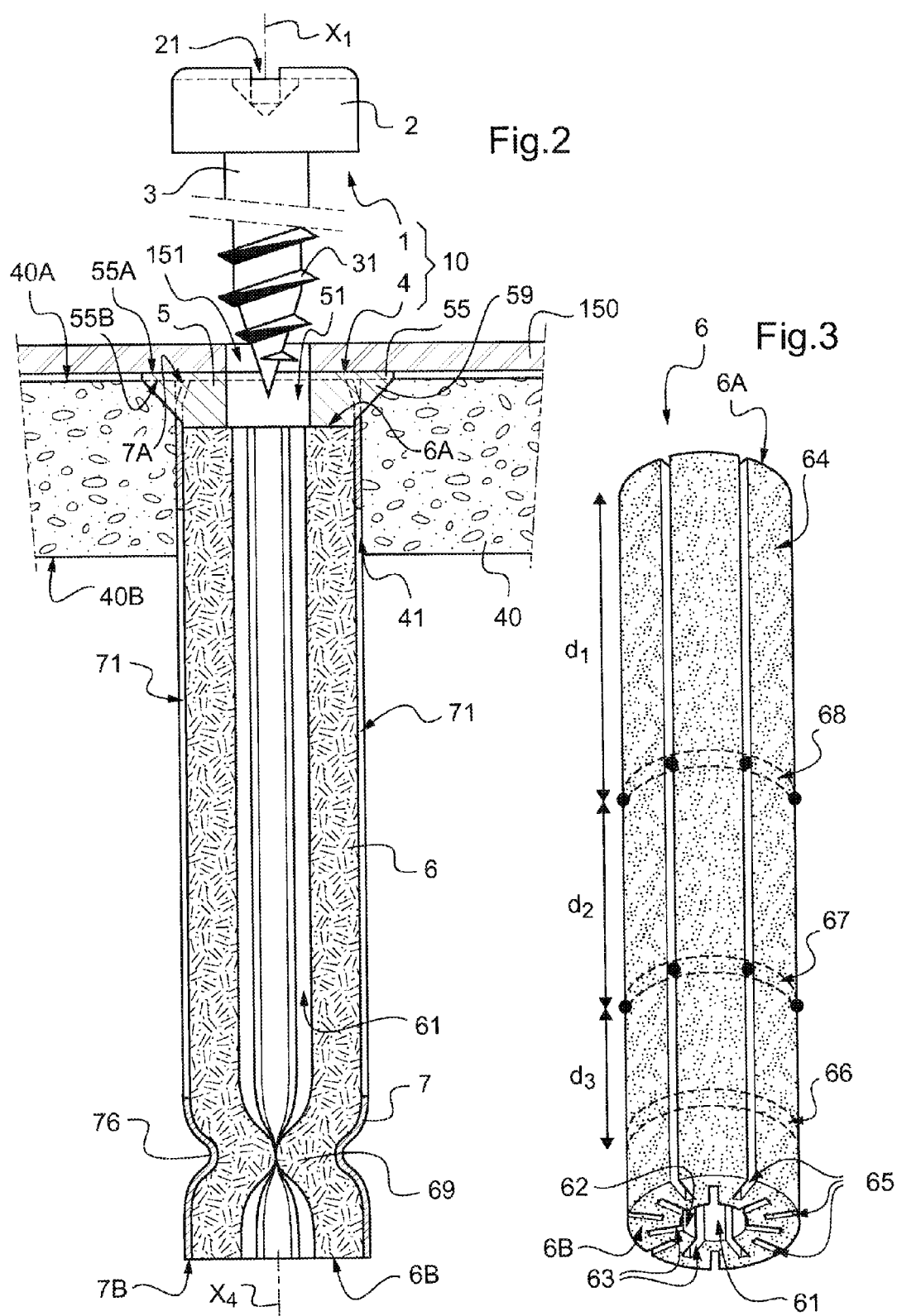

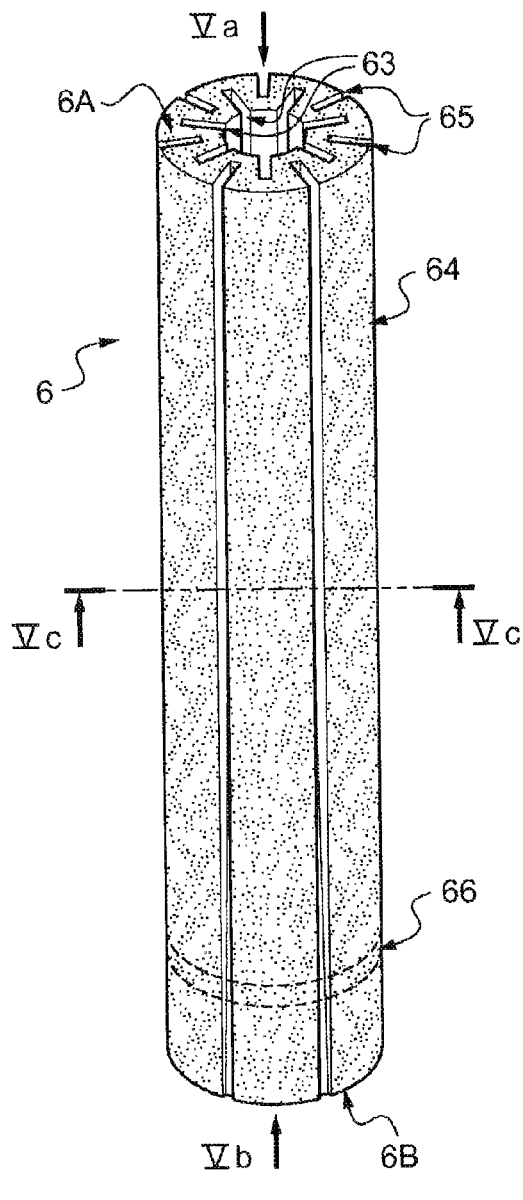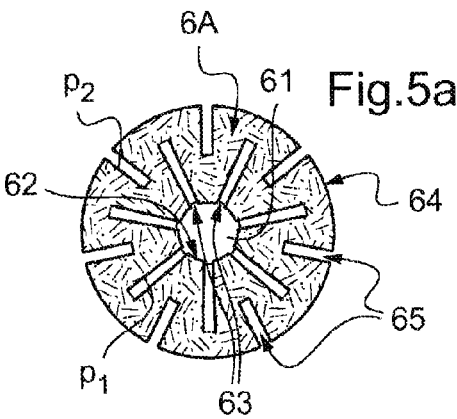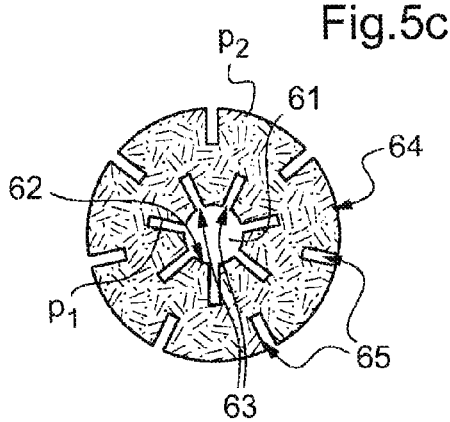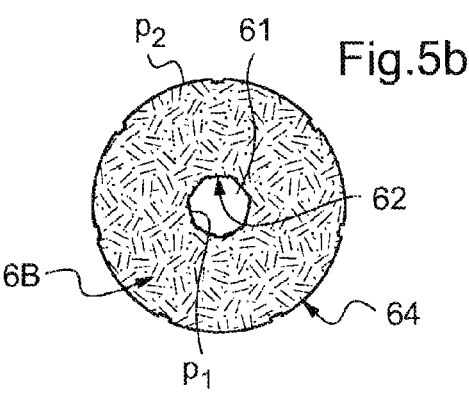

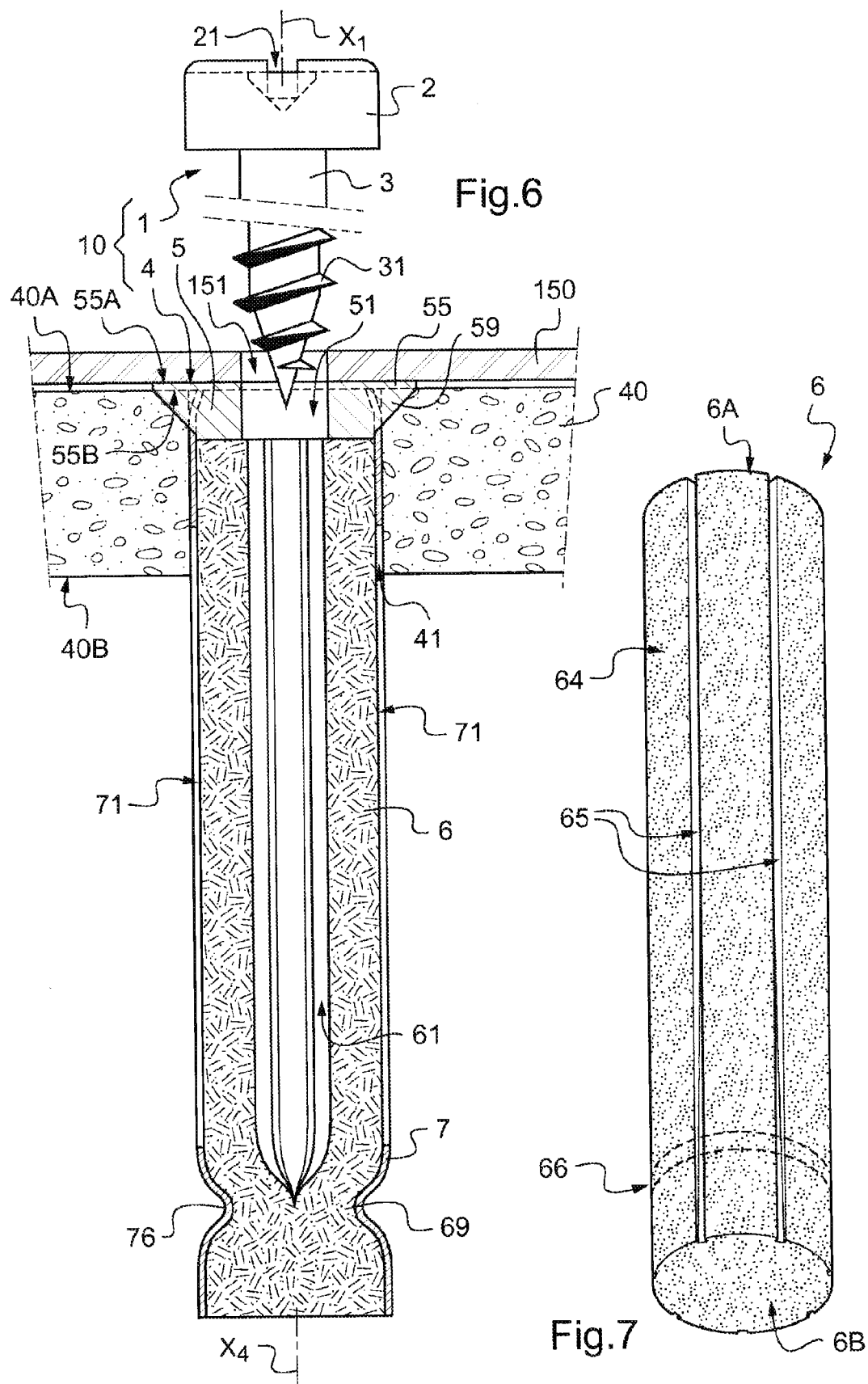

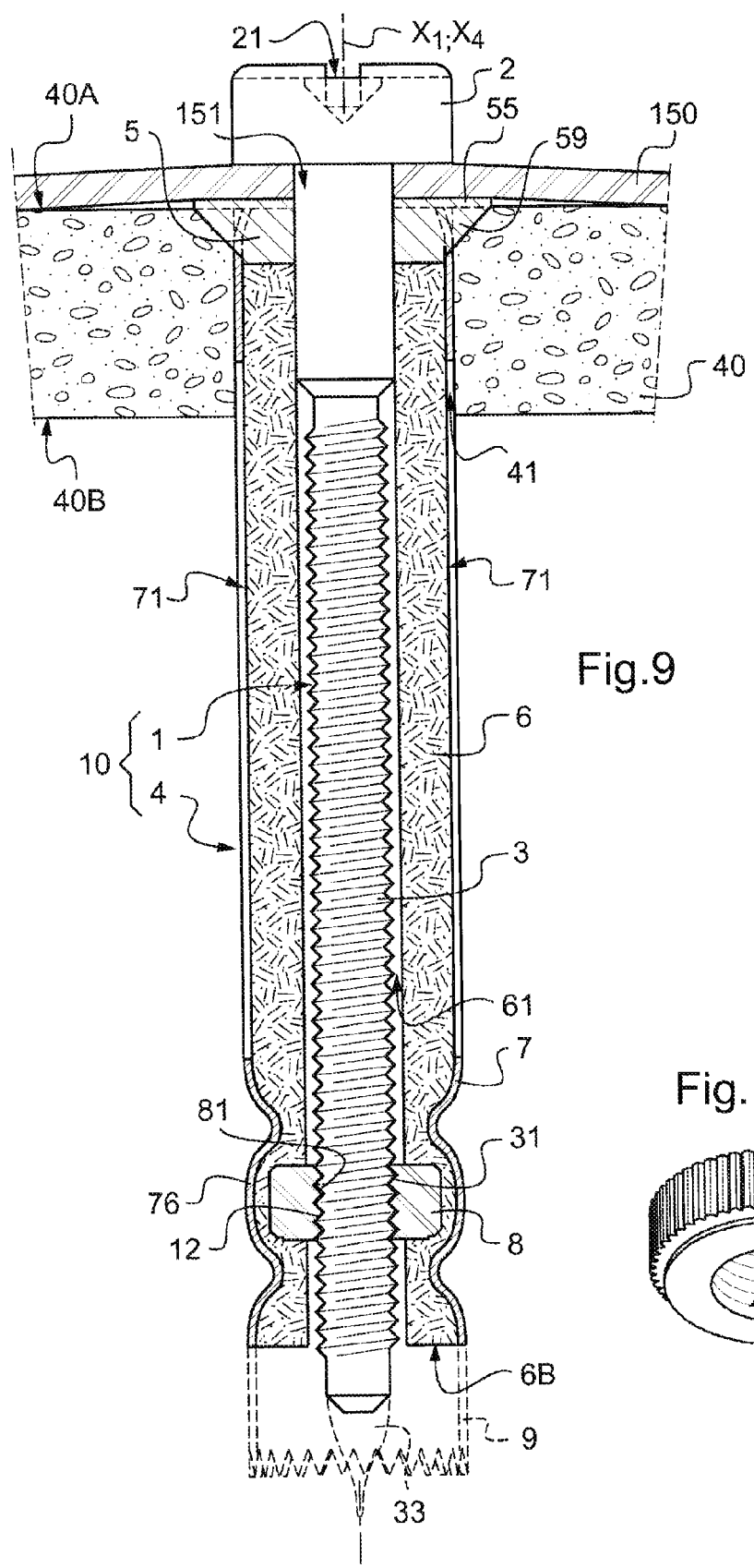
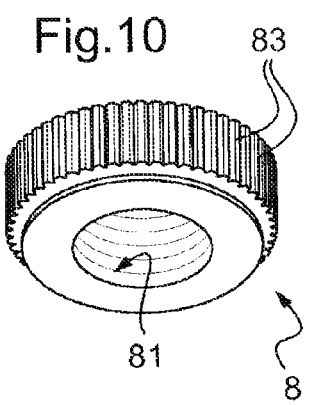

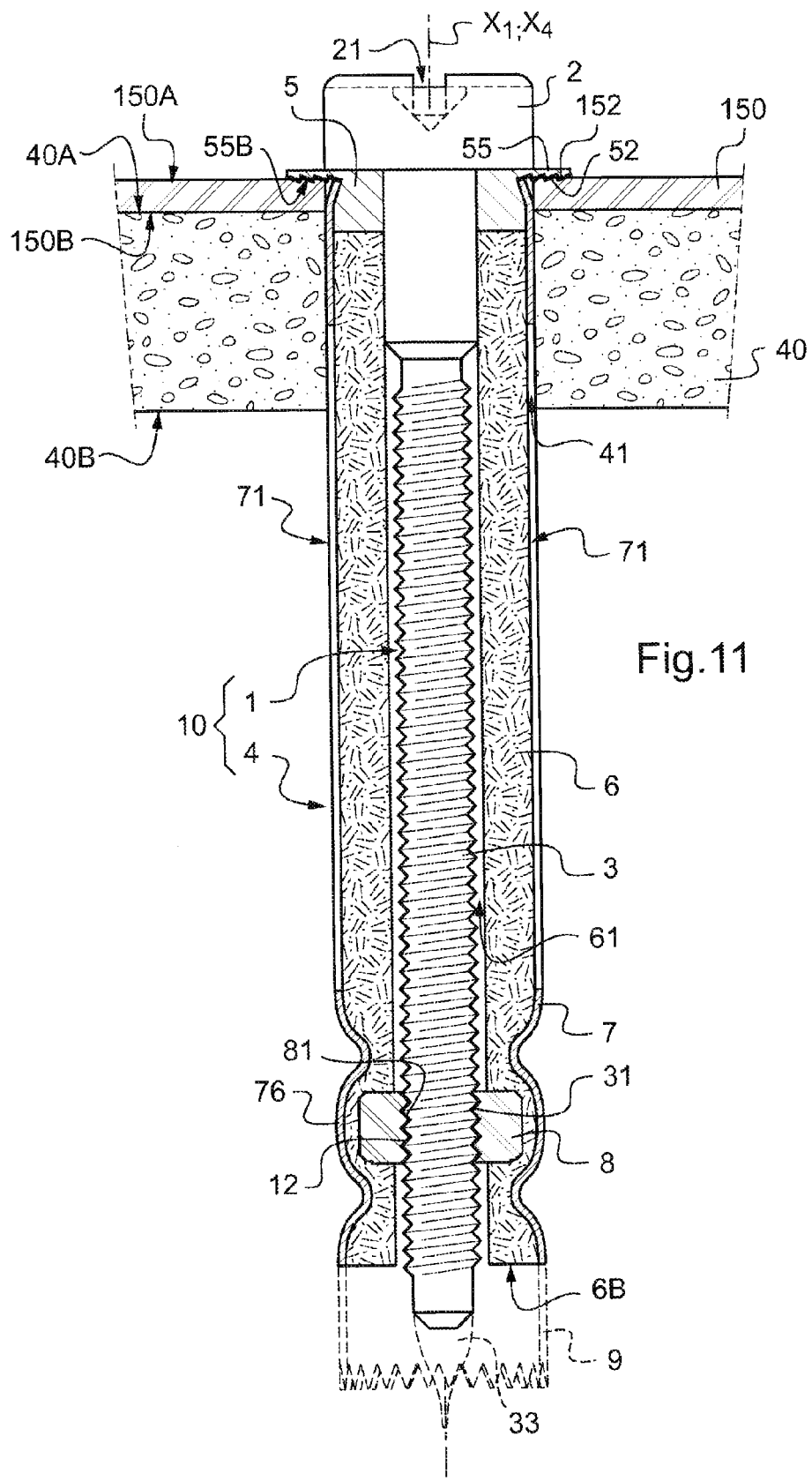

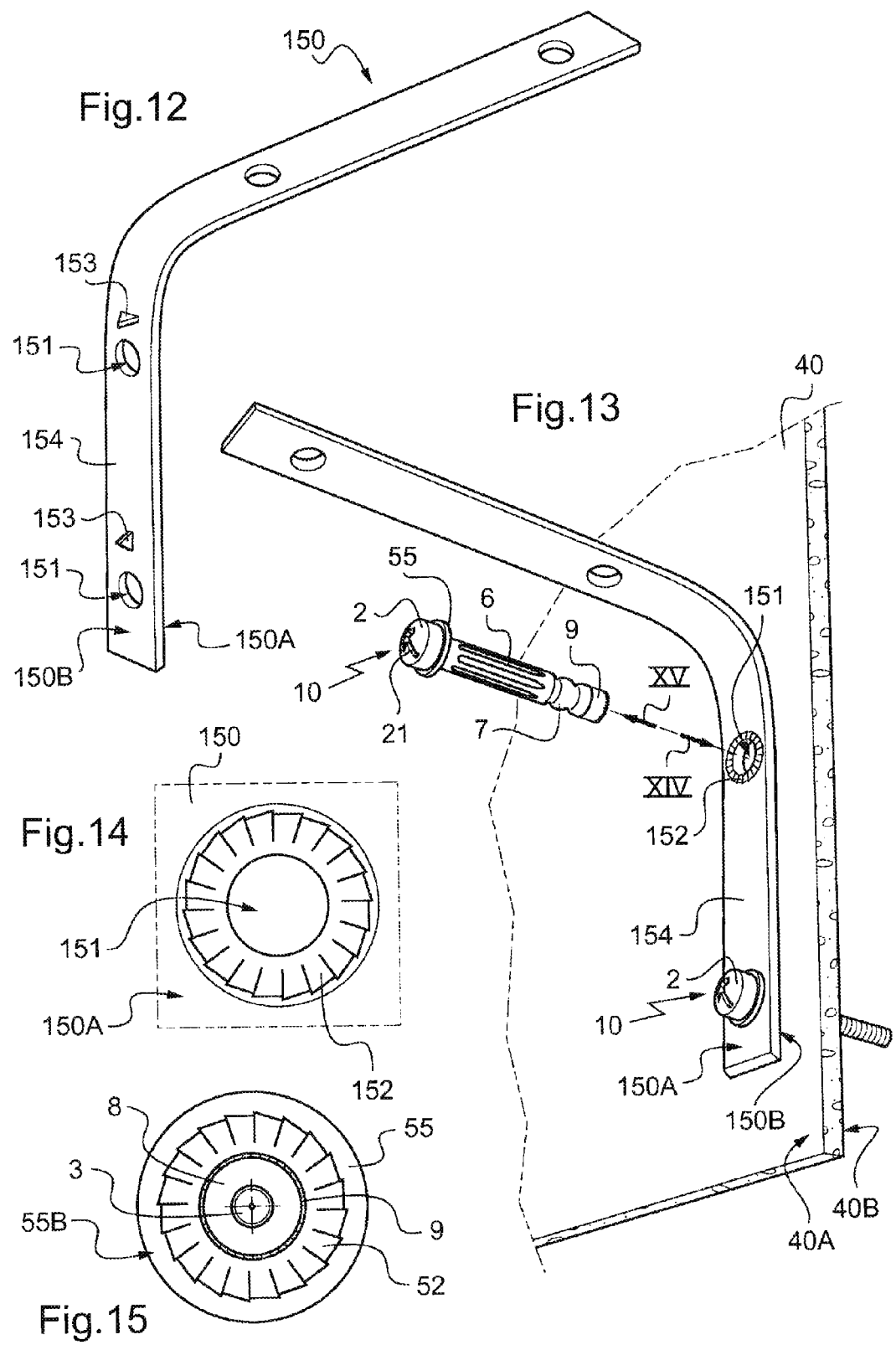

EXPANSION ANCHOR

The present invention relates to an expansion anchor for fixing in a wall and to use of such an anchor.

It is known to fix a part to a relatively thin wall, such as a plasterboard, with the aid of an expansion anchor comprising a screw and a deformable anchor body. As a result of screwing of the screw into a tapped portion of the anchor body, or by using a specific tool, the anchor body is deformed from an initial state for insertion in the wall into a deployed state in the wall or at the rear of the wall. In its deployed state, the anchor body ensures anchoring of the screw with respect to the wall.

There exist several types of known expansion anchors which differ in terms of the structure of their anchor body.

In a first type of known anchor, the anchor body comprises a plurality of elongated metal legs which are distributed circumferentially around the screw shank. These metal legs are designed to bend and fold flat against the rear face of the wall, spread out in a star shape. The contact between the metal legs of the anchor body and the rear face of the wall, which is generally made of a less rigid material, tends to weaken the wall, thereby adversely affecting the extraction resistance of the anchor. The extraction resistance of this type of anchor is likewise limited by the surface of the metal legs.

Another known type of anchor, such as that described in U.S. Pat. No. 2,918,841 A, comprises a tubular anchor body made of plastic material comprising a plurality of circumferentially distributed longitudinal slits. These slits define a plurality of strips which are deformable helically during screwing of the screw into a tapped portion of the body. The helically deformed strips come into contact with the rear face of the wall in zones of projecting folds. Owing to the rigidity of the plastic material forming the body, these projecting fold zones cause an indentation and weaken the wall, this tending to reduce the pull-out strength of the anchor. Moreover, the helically deformed strips form a load-bearing disc at the rear of the wall. With such an arrangement, there is a risk of the tapped portion of the body being pulled out through the hole in the wall when a pull-out force is applied on the screw head side, this also limiting the pull-out strength of the anchor.

It is these drawbacks which the invention intends more particularly to overcome by proposing an expansion anchor for fixing in a wall, in particular in a plasterboard, which has an improved extraction resistance compared to the anchors of the prior art.

To this end, one subject of the invention is an expansion anchor for fixing in a wall, comprising a screw having a head and a shank provided with a thread, and an anchor body designed to receive the shank of the screw, the anchor body comprising:
- a flange intended to be directed towards the head of the screw,
- a nut-forming portion designed to cooperate with the thread of the screw,
- a deformable expansion portion between the flange and the nut-forming portion, the nut-forming portion being designed to advance in the direction of the flange, by deforming the expansion portion from an initial state for insertion in a wall to a deployed state, under the action of screwing the screw in the nut-forming portion, characterized in that the expansion portion comprises a membrane made of polymer material, having an internal bore for receiving the shank of the screw, each of the inner and outer peripheral surfaces of the membrane being provided with a plurality of circumferentially distributed and radially open longitudinal grooves which increase the circumferential surface area of the membrane, and in that, in a configuration where the anchor is mounted inside a hole in a wall, with the flange bearing against a first face of the wall and the expansion portion projecting from a second face of the wall, the expansion portion in the deployed state forms a continuous contact surface facing the second face of the wall and has a load-bearing section, transversely with respect to the axis of the screw, which is generally decreasing from the contact surface towards the nut-forming portion.

Within the meaning of the invention, "generally decreasing load-bearing section" is understood as meaning the fact that the load-bearing section:
- either is continuously decreasing from the contact surface towards the nut-forming portion,
- or comprises at least two superimposed bulges, the maximum cross-section of one bulge being greater than the maximum cross-section of the following bulge in the direction from the contact surface towards the nut-forming portion.

Thanks to the invention, the available volume of the anchor body is made use of in an optimum manner in order to withstand the load in the deployed state of the expansion anchor. Owing to the membrane made of polymer material, the expansion portion in the deployed state forms a continuous contact surface facing the rear face of the wall, thus ensuring a broad surface for taking up the load. In particular, compared to the anchor with metal legs according to the prior art, which has a discrete contact surface at the rear of the wall, the anchor according to the invention allows, for a same radius of the contact surface, an increase in the contact area, this reducing the shearing stresses acting on the wall. Advantageously, the membrane is relatively rigid so as to ensure good load absorption, while exerting a gentle action on the wall. The longitudinal grooves allow a high degree of deformation—and therefore sufficient expansion—of the membrane to be obtained. It should also be noted that, with the anchor according to the invention, compared to the anchor with metal legs, it is not required to have such large radii of the contact surface in order to achieve a same degree of reduction in the stresses, because the gain in contact area compensates for the reduction in the radius of the contact surface. Moreover, the load-bearing section of the expansion portion in the deployed state has a generally frustoconical shape between the contact surface and the nut-forming portion, where the large base of the cone is defined by the contact surface. This frustoconical geometry with a cross-section generally decreasing starting from the contact surface is optimum for redirecting the load acting on the wall surface towards the nut-forming portion. This results in a more rigid behavior of the anchor body, which prevents the nut-forming portion from being pulled out through the hole in the wall, owing to yielding of the load-bearing disc.

According to an advantageous feature, the load-bearing section of the expansion portion in the deployed state is centered on the axis of the screw. Such a configuration ensures a good distribution of the load, which improves the extraction resistance of the anchor.

In an advantageous manner, the anchor comprises guiding means for guiding the deformation of the expansion portion from the initial state to the deployed state, which ensure that the load-bearing section of the expansion portion in the deployed state is generally decreasing from the contact surface towards the nut-forming portion.

In one embodiment of the invention, the guiding means for guiding the deformation of the expansion portion comprise at least two circumferential joining zones in which at least some longitudinal grooves of the membrane are closed, the longitudinal dimension of each section defined between two successive joining zones decreasing from the flange towards the nut-forming portion. This arrangement is such that it guides the formation of successive bulges of the membrane during deformation of the expansion portion, where the bulges have a decreasing cross-section from the contact surface towards the nut-forming portion owing to the decreasing longitudinal dimension of the sections defined between the joining zones.

In another embodiment of the invention, the guiding means for guiding the deformation of the expansion portion comprise a perimeter of the membrane decreasing from the flange towards the nut-forming portion. The deformation of the membrane is all the greater, the larger its inner and/or outer perimeter. Hence the structure of the membrane with a perimeter decreasing in the direction of the nut-forming portion guides, during deformation of the expansion portion, the formation of a profile of the membrane with a cross-section decreasing from the contact surface towards the nut-forming portion.

Preferably, the membrane is made of an elastomeric material having a more rigid behavior when its deformation increases. Thus, a compromise is achieved between, on the one hand, a high deformability of the membrane when the expansion portion passes from the initial insertion state to the deployed state and, on the other hand, a high contribution of the membrane in supporting the load in the deployed state of the expansion portion.

Advantageously, the expansion portion comprises a deformable casing positioned around the membrane so as to guide or confine deformation of the membrane, this casing being connected to the nut-forming portion. By way of example, the deformable casing may have a form similar to an anchor body with metal legs according to the prior art, the membrane thus being inserted inside this body. In the deployed state of the expansion portion, the membrane thus fills the free space between the metal legs facing the rear face of the wall, this increasing the extraction resistance of the anchor compared to the case where only the metal legs take up the load.

According to an advantageous feature, the guiding means for guiding the deformation of the expansion portion comprise longitudinal motifs of the casing designed to guide the deformation of the casing such that that it flares outwardly starting from the nut-forming portion.

According to another advantageous feature, the guiding means for guiding the deformation of the expansion portion comprise two circumferential folding zones of the casing which define between them a portion for bearing against the second face of the wall in the deployed state of the expansion portion.

According to one feature, the casing is made of metallic material.

In one embodiment, the nut-forming portion is a portion of the membrane which can be tapped by the screw. As a variant, the nut-forming portion may be a separately mounted part which is attached to the expansion portion.

According to one aspect of the invention, the expansion portion of the anchor body and the nut-forming portion are fastened together by crimping.

According to one feature, the anchor comprises rotation locking means for rotationally locking the anchor body with respect to the wall in a position where the flange bears against the wall or against a part to be fixed to the wall.

In one embodiment, the anchor body comprises a piercing element at its opposite end from the flange. The anchor is thus self-drilling. It makes it possible to fix a part to a wall without having to drill beforehand a hole in the wall, simply by driving the screw of the anchor in rotation by means of a conventional screwing tool. In order to allow the drilling and then the deformation of the expansion portion by driving the screw in rotation, the anchor comprises fastening means between the screw and the anchor body which are detachable for a torque, applied between the screw and the anchor body, greater than or equal to a predetermined torque. The predetermined torque must in particular be greater than the torque necessary for piercing the wall and less than the torque for which the rotation locking means of the anchor body with respect to the wall are no longer effective.

Another subject of the invention is also the use of an anchor such as that described above for fixing in a thin wall, in particular a construction panel, such as a plasterboard, including a fiber reinforced plasterboard or a fiber clad plasterboard, in particular using glass fibers (glass mat); a cement board; a chipboard; a wooden panel; a hollow clay block. Such construction panels may be associated with an insulating panel, in particular the invention may be applied for performing fixing in a composite panel formed, for example, by assembly of a plasterboard and an expanded polystyrene panel, or by assembly of a plasterboard and a polyurethane foam panel.

In particular, a subject of the invention is the use of an anchor such as that described above for fixing in a plasterboard having a volumetric core density less than 650 kg/m$^3$, preferably less than 550 kg/m$^3$. A plasterboard comprises conventionally a layer of plaster (dehydrated calcium sulfate), called core, which is lined on each of its main faces by a sheet of cardboard, paper and/or mineral fibers. The sheets on the main faces of the core act both as a reinforcement and as a facing, the composite thus formed having good mechanical properties. The volumetric core density range less than 650 kg/m$^3$, preferably less than 550 kg/m$^3$, corresponds to ultra-lightweight plasterboards, for which use of the anchor according to the invention is particularly advantageous since its extraction resistance is improved.

Finally, a subject of the invention is an assembly comprising a plasterboard with a volumetric core density less than 650 kg/m$^3$, preferably less than 550 kg/m$^3$, and an anchor such as that described above, which is fixed or intended to be fixed in the plasterboard.

The features and advantages of the invention will emerge from the description below of several embodiments of an expansion anchor according to the invention, provided solely by way of example and with reference to the accompanying drawings in which:

FIG. 2 is a cross-section along the plane II of FIG. 1 in the configuration where the anchor body is mounted inside a hole in a wall, the expansion portion of the anchor body being in its initial insertion state, this figure also showing the screw of the anchor and a part to be fixed to the wall by means of the anchor;

FIG. 3 is a perspective view of the membrane of the expansion portion of the anchor body shown in FIGS. 1 and 2;

FIG. 5 is a view similar to that of FIG. 3, showing the membrane of the expansion portion for an anchor according to a second embodiment of the invention;

FIGS. 5a and 5b are cross-sections in the direction of the arrows Va and Vb shown in FIG. 5;

FIG. 5c is a cross-section along the line Vc-Vc shown in FIG. 5;

FIG. 6 is cross-section similar to that of FIG. 2, for an anchor according to a third embodiment of the invention;

FIG. 7 is a perspective view of the membrane of the expansion portion of the anchor body shown in FIG. 6;

FIG. 9 is a cross-section along the plane IX shown in FIG. 8 in the configuration where the anchor body is mounted in a hole in a wall, the expansion portion of the anchor body being in its initial insertion state, this figure also showing the screw of the anchor and a part to be fixed to the wall by means of the anchor;

FIG. 10 is a perspective view of the nut of the anchor shown in FIG. 9;

FIG. 11 is a cross-section similar to that of FIG. 9, for an anchor according to a fifth embodiment of the invention;

FIG. 12 is a perspective view of the part to be fixed to the wall, shown in FIG. 11;

FIG. 13 is a perspective view of the part shown in FIG. 12 while being fixed to the wall by means of two anchors such as those shown in FIG. 11;

FIG. 14 is a view in the direction of the arrow XIV shown in FIG. 13;

FIG. 15 is a view in the direction of the arrow XV shown in FIG. 13;

Figure 19:
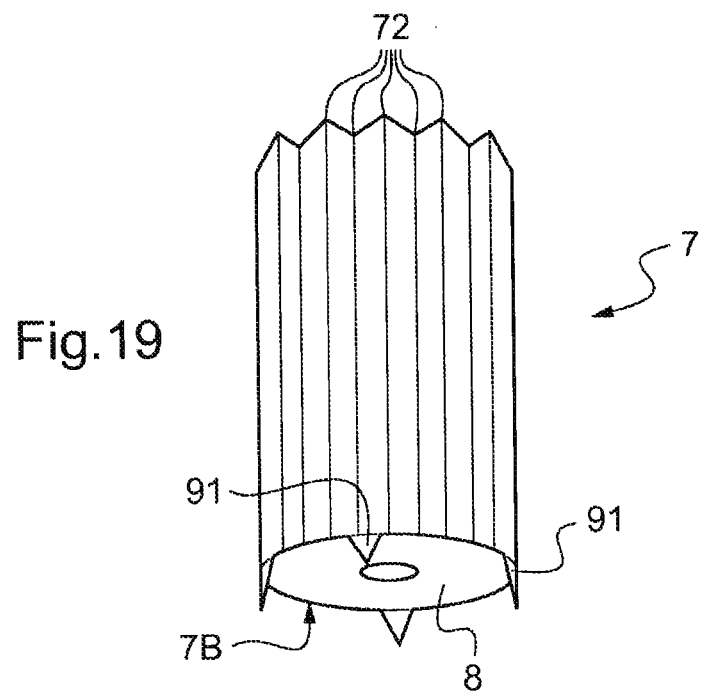
Figure 20:
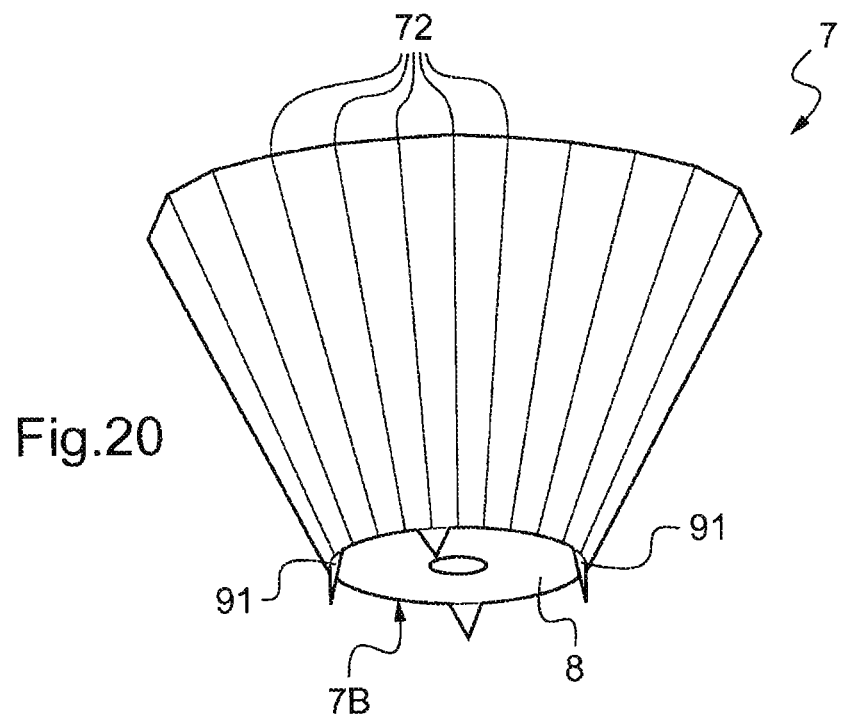

FIG. 19 is a perspective view of the casing of the expansion portion for an anchor according to an eighth embodiment of the invention, where the casing is in a configuration corresponding to the initial insertion state of the expansion portion; and FIG. 20 is a perspective view, similar to that of FIG. 19, where the casing is in a configuration corresponding to the deployed state of the expansion portion.

In the first embodiment shown in FIGS. 1 to 4, the expansion anchor 10 according to the invention is intended to fix a part onto a wall which has a small thickness. The anchor 10 comprises a screw 1 and a deformable anchor body 4. The screw 1, the longitudinal axis of which is denoted by $X_1$, comprises a head 2 and a shank 3 provided with a thread 31. The anchor body 4 has an elongated shape centered on an axis $X_4$ and is designed to receive the shank 3 of the screw, the axes $X_1$ and $X_4$ thus coinciding.

Figure 1:
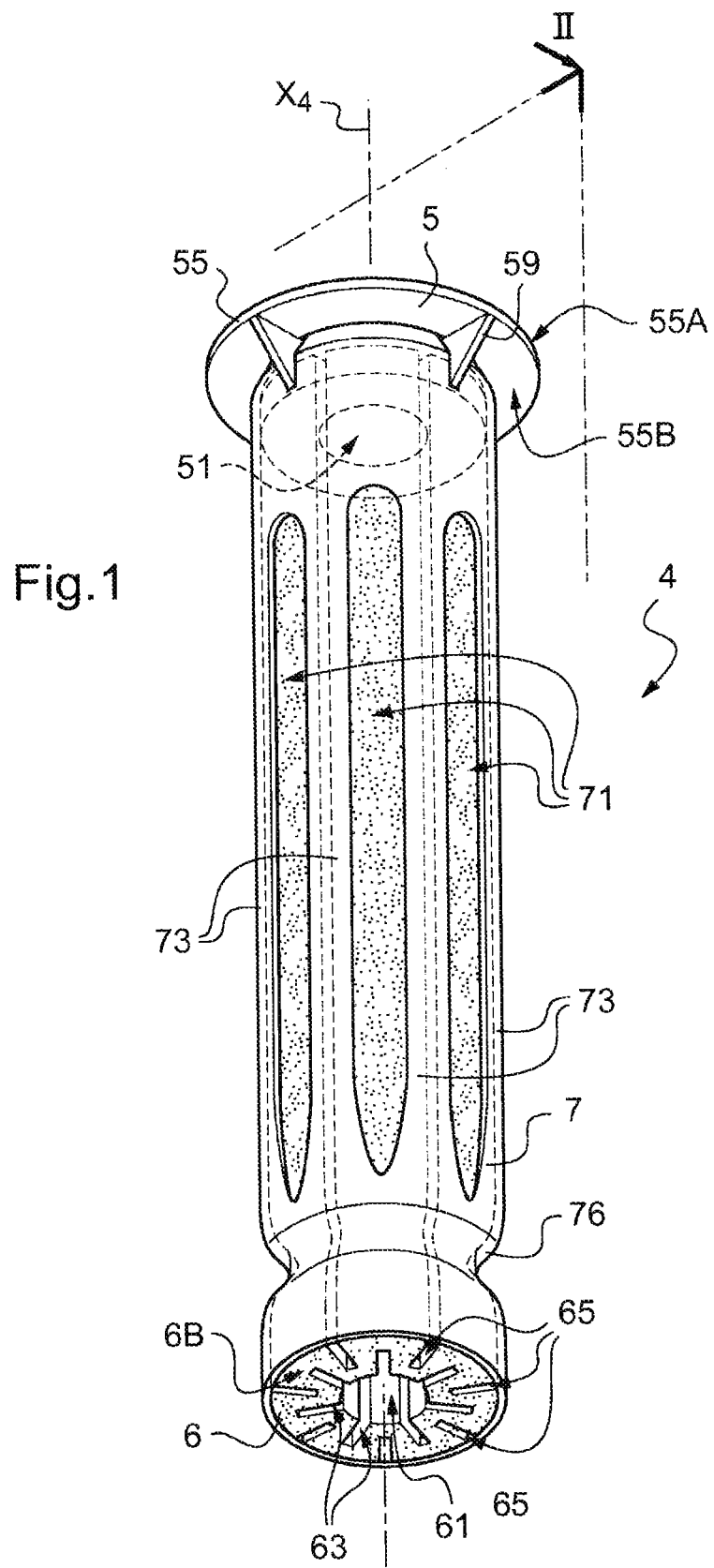
FIG. 1 is a perspective view of the body of an anchor according to a first embodiment of the invention.

As can be seen in FIG. 1, the anchor body 4 comprises a membrane 6 with an elongated shape which is made of elastomeric material and comprises an internal bore 61 for receiving the shank 3 of the screw. One of the ends 6A of the membrane 6 bears against a cap 5 comprising a central bore 51. The bore 51 is positioned in the extension of the bore 61 of the membrane, such that the screw shank may be received in succession inside the bores 51 and 61. At its end opposite from the membrane, the cap 5 is provided with a flange 55, one face 55A of which is intended to be directed towards the head 2 of the screw. In the vicinity of the other face 55B of the flange 55, the cap comprises a series of circumferentially distributed anti-rotation fins 59.

The anchor body 4 also comprises an outer casing 7 made of metallic material, which is positioned around the membrane 6 and the cap 5, extending from the face 55B of the flange to the vicinity of the end 6B of the membrane opposite from the end 6A. One of the ends 7A of the casing 7 is fixed by means of wedging against the face 55B of the flange 55. The casing 7 is also crimped around the membrane 6, in the region of a portion 76 close to the other end 7B of the casing, thereby fastening together the membrane and the casing while fixing the membrane in position against the cap 5. The crimping of the casing 7 in the region of the portion 76 creates a constricted portion 69 in the membrane 6. As can be seen in FIG. 2, the bore 61 of the membrane is closed off in the region of this portion 69, which forms a portion able to be tapped by the shank 3 of the screw. The casing 7 comprises longitudinal apertures 71 which extend parallel to the axis $X_4$ of the anchor body, between the flange 55 and the crimped portion 76. The apertures 71 define between them deformable metal arms 73. The casing 7 may be made from a flat metal blank in which the apertures 71 are machined, the metal blank being then shaped with a cylindrical form with welding of its two ends so as to form the tubular casing 7. As a variant, the casing 7 may be obtained from a metal tube in which the apertures 71 have been punched. The casing 7 may be made of any metallic material, in particular steel.

In this first embodiment, the membrane 6 is tubular with a constant cross-section along its entire length. More precisely, the membrane 6 has the shape of a cylindrical tube with a circular cross-section where each of the peripheral surfaces, i.e. the inner peripheral surface 62 and the outer peripheral surface 64, of the tube is provided with a plurality of circumferentially distributed grooves. As can be clearly seen in FIG. 3, the grooves 63 of the inner surface 62 are radially open towards the central bore of the tube, while the grooves 65 of the outer surface 64 are opened radially towards the outside of the tube. The presence of the grooves 63 and 65 increases the circumferential surface area of the membrane 6 and therefore its deformability. Advantageously, the membrane 6 of the first embodiment is made by means of extrusion. Preferably, the membrane is made of an elastomeric material having a more rigid behavior when its deformation increases, in particular an ethylene-propylene-diene terpolymer (EPDM) or vulcanized rubber to which carbon black has been added.

Owing to their constituent materials and their geometrical forms, the membrane 6 and the casing 7 are designed to deform radially outwards when a compacting force is exerted on the crimped portions 76 and 69 in the direction of the flange 55. The membrane 6 and the casing 7 thus form the expansion portion of the anchor 10, which is deformable from an initial state for insertion in a wall, visible in FIG. 2, to a deployed state, visible in FIG. 4.

In order to guide the deformation of the expansion portion, the membrane 6 comprises two series of joining points which define two circumferential joining zones 67 and 68 in which the outer grooves 65 of the membrane are closed. In the assembled state of the anchor body 4, the outer grooves 65 of the membrane are also closed in a third circumferential joining zone 66, corresponding to the crimped zone of the casing 7. With a view to obtaining a degree of deformation of the membrane 6 generally decreasing, from the end 6A towards the crimped zone 66, the circumferential joining zones 66, 67 and 68 are arranged so that the length of each membrane section defined between two successive joining zones decreases from the end 6A towards the crimped zone 66. Thus, as shown in FIG. 3, the length $d_1$ of the membrane section defined between the end 6A and the circumferential zone 68 is greater than the length $d_2$ of the membrane section defined between the circumferential joining zones 68 and 67, which is itself greater than the length $d_3$ of the membrane section defined between the circumferential joining zone 67 and the crimped zone 66.

Fixing of a part 150 onto a wall 40 by means of the anchor 10 is performed in the manner described below, with reference to FIGS. 2 and 4. By way of a non-limiting example, the wall 40 onto which the part 150 is to be fixed is a plasterboard.

Firstly, a hole 41 is drilled in the wall 40 and the anchor body 4 is inserted therein, the expansion portion 6, 7 thereof being in its initial insertion state, until the face 55B of the flange 55 comes into contact against the front face 40A of the wall. In this configuration, the expansion portion formed by the membrane 6 and the casing 7 projects from the rear face 40B of the wall, as can be seen in FIG. 2. Moreover, the anti-rotation fins 59 are retained inside the material of the wall 40 in the vicinity of the front face 40A so that the anchor body 4 is rotationally locked with respect to the wall.

The part 150 to be fixed onto the wall 40 is then positioned against the face 40A of the wall and the face 55A of the flange, a hole 151 in the part being aligned with the bores 51 and 61 in the anchor body 4. The shank 3 of the screw is then engaged inside the hole 151 of the part and the bores 51 and 61 until the end of the shank 3 bears against the tappable portion 69 of the membrane 6. The screw 1 is driven in rotation in the conventional screwing direction, by the action of a tool inside the recess 21 provided for this purpose in the head 2 of the screw, so that the portion 69 is gradually passed through by the shank 3 of the screw and tapped by the latter. The portion 69 thus forms a nut engaged with the thread 31 of the screw.

Figure 4:
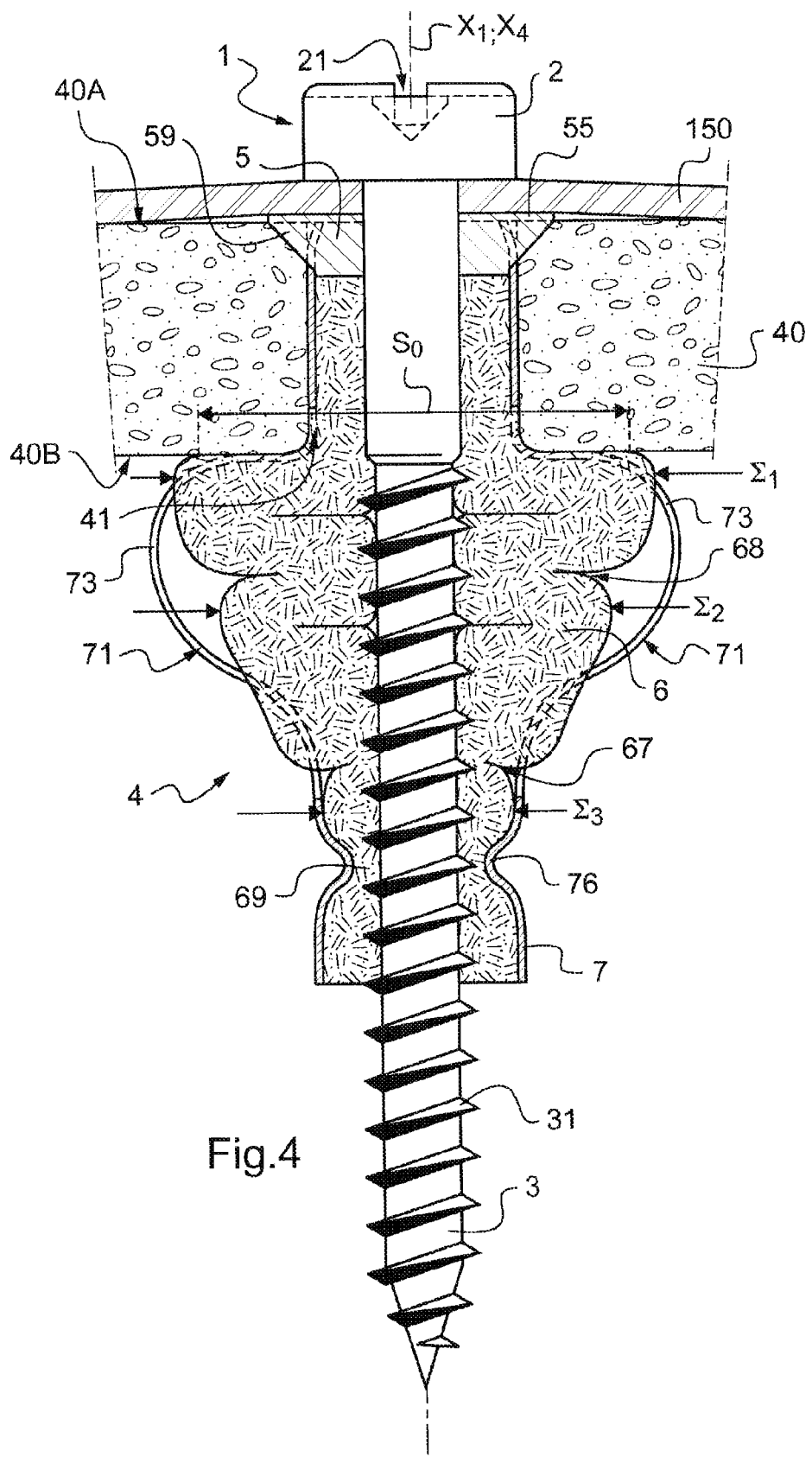
FIG. 4 is a cross-section similar to that of FIG. 2, in the deployed state of the expansion portion of the anchor body, the part being thus fixed to the wall.

By continuing to drive the screw 1 in rotation in the conventional screwing direction, the nut-forming portion 69 rises up along the shank 3 of the screw in the direction of the flange 55, while deforming the expansion portion formed by the membrane 6 and the casing 7 from the initial insertion state to the deployed state visible in FIG. 4. When the expansion portion is in the deployed state, the anchor 10 is firmly anchored in the wall 40 and the part 150 is fixed to the wall, being fixed in position between the flange 55 and the head 2 of the screw.

In the deployed state of the expansion portion, the arms 73 of the casing 7 are radially deformed outwardly and the apertures 71 are enlarged. Moreover, the membrane 6 is compressed against the rear face 40B of the wall in the form of a profile with three bulges. The first bulge, which is closest to the face 40B, is defined between the face 40B and the joining zone 68 of the membrane and forms a continuous contact surface $S_0$ facing the rear face 40B. The second and third bulges are defined, respectively, between the two joining zones 68 and 67 and between the joining zone 67 and the nut-forming portion 69. The continuous contact surface $S_0$ facing the rear face 40B ensures a large surface area for taking up the load. In practice, the rear face 40B of the wall receives against it the deformed arms 73 of the casing 7 and the portions of the surface $S_0$ of the membrane 6 which emerge between the arms 73. Since the membrane 6 is made of an elastomeric material which exerts a gentle action against the rear face 40B of the wall and the pressure of the expansion portion against the wall is exerted mainly via the membrane and only marginally via the arms 73 of the metal casing, the deterioration of the rear face of the wall is limited. The integrity of the wall 40 in contact with the expansion portion is thus preserved, this being important for ensuring a good extraction resistance of the anchor 10.

As can be clearly seen in FIG. 4, the expansion portion 6, 7 in the deployed state has a load-bearing section, transversely with respect to the axis $X_1$ of the screw, which is generally decreasing from the contact surface $S_0$ towards the nut-forming portion 69. Indeed, it is the membrane 6 which supports mainly the load, the casing 7 playing a smaller part, and the maximum cross-section $\Sigma_1$ of the first bulge of the membrane, which is closest to the contact surface $S_0$, is greater than the maximum cross-section $\Sigma_2$ of the second intermediate bulge, which is itself greater than the maximum cross-section $\Sigma_3$ of the third bulge, which is closest to the nut-forming portion 69. This geometrical form with a cross-section generally decreasing from the contact surface $S_0$ allows the load acting on the rear face 40B of the wall to be redirected towards the nut-forming portion 69. Advantageously, the deformation of the expansion portion takes place such that the load-bearing section is centered on the axis $X_1$ of the screw, this ensuring a good redistribution of the load around the screw.

Owing to the continuous contact surface $S_0$ formed facing the rear face 40B of the wall, which exerts a gentle action on the wall owing to the elastomeric material forming the membrane 6, the stresses acting on the rear of the wall 40 are limited. This, together with redirection of the load towards the nut-forming portion 69 resulting from the generally frustoconical shape of the membrane 6 in the deployed state of the expansion portion, ensures an optimized extraction resistance of the anchor 10.

In all embodiments described below, which are variants of the first embodiment, elements similar to those in the first embodiment have identical reference numbers.

The anchor of the second embodiment shown in FIG. 5 differs from that of the first embodiment with regard only to the geometrical form of its membrane 6. As shown in FIG. 5, the membrane 6 of the second embodiment does not have a constant cross-section along the whole of its length because the inner grooves 63 and the outer grooves 65 of the membrane have a thickness gradient, in the longitudinal direction of the membrane, which decreases from the end 6A of the membrane towards the end 6B. The inner perimeter $p_1$ of the membrane 6, including the contour of each inner groove 63, also decreases from the end 6A towards the end 6B. In the same way, the outer perimeter $p_2$ of the membrane 6, including the contour of each outer groove 65, decreases from the end 6A towards the end 6B. This specific structure of the membrane 6 allows the deformation of the expansion portion to be guided so as to obtain a degree of deformation of the membrane 6 which generally decreases from the end 6A towards the crimped zone 66. Advantageously, the membrane 6 of this second embodiment is manufactured by means of molding, in particular molding by means of injection of the elastomeric material forming the membrane.

The anchor of the third embodiment shown in FIGS. 6 and 7 differs from that of the second embodiment solely in that the section of the membrane 6 is solid between the crimped zone 66 and the end 6B. The area of interaction between the thread 31 of the screw and the tappable portion 69 of the membrane is thus increased, this helping ensure a greater rigidity of the anchor body 4 in the deployed state of the expansion portion.

Figure 8:
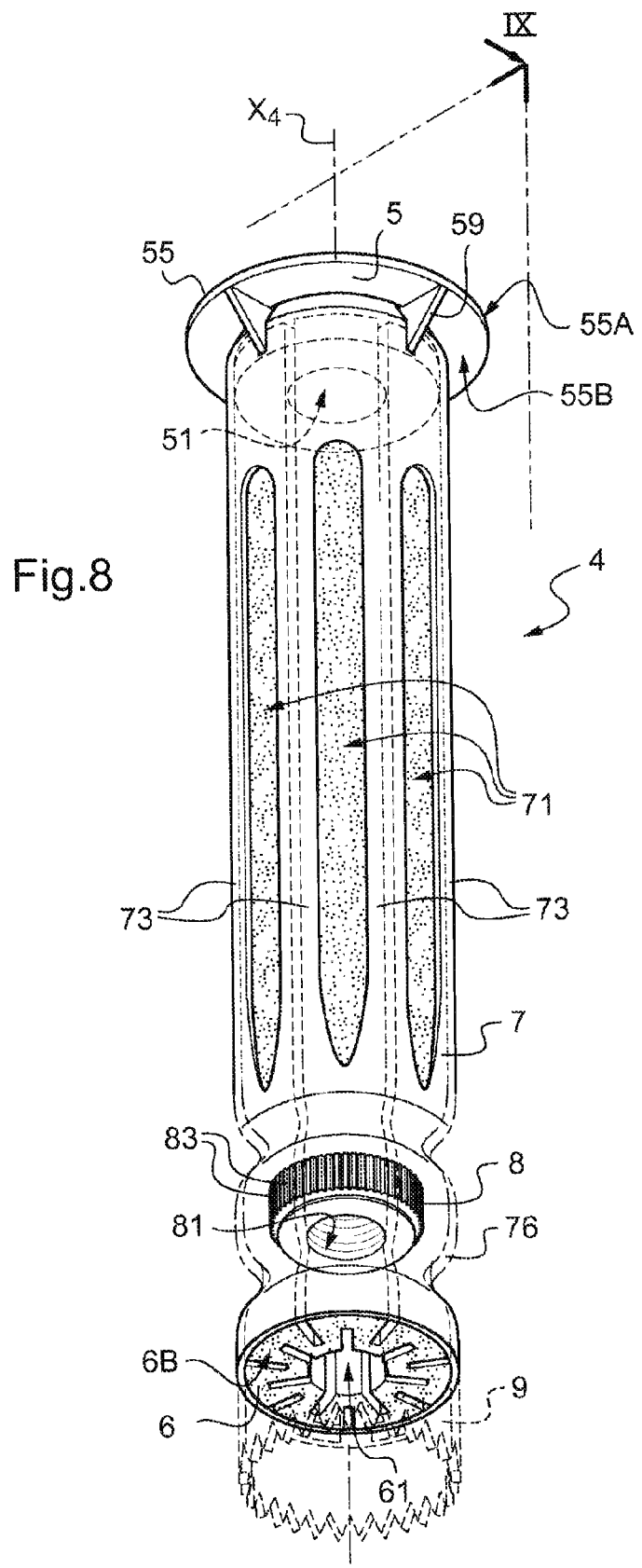
FIG. 8 is a perspective view, similar to that of FIG. 1, of the body of an anchor according to a fourth embodiment of the invention.

In the fourth embodiment shown in FIGS. 8 to 10, the anchor body 4 comprises a metal nut 8 inserted in the membrane 6 in the vicinity of the end 6B. The nut 8 is fixed in position rotationally with respect to the membrane 6 and the casing 7, owing to anti-rotation teeth 83 which are gripped inside the material of the membrane 6, and translationally parallel to the axis $X_4$ of the anchor body by means of crimping of the casing 7 around the nut. The nut 8 acts in the manner of the nut-forming portion 69 of the preceding embodiments.

More precisely, the nut 8 comprises an internal tapped portion 81 complementing the thread 31 of the screw. Under the action of screwing the screw 1, the nut 8 is designed to advance in the direction of the flange 55, by deforming the expansion portion 6, 7 from an initial insertion state visible in FIGS. 8 and 9 to a deployed state similar to that shown in FIG. 4.

In this fourth embodiment, the anchor body 4 may comprise moreover a piercing element 9 formed in the continuity of the casing 7, as shown in broken lines in FIGS. 8 and 9. In the example shown in FIGS. 8 and 9, the piercing element 9 is in the form of a hole saw. Advantageously, the end 33 of the shank 3 of the screw opposite from the head 2 is tapered so as to form a centering tip for the hole saw 9. As a result of the piercing element 9, the anchor 10 is self-drilling. It is thus possible to fix a part on a wall by means of the anchor 10 by driving the screw 1 in rotation with the aid of a conventional screwing tool, without having to drill beforehand a hole in the wall using a drill.

For this purpose, a layer of adhesive 12 is inserted between the tapped portion 81 of the nut 8 and the thread 31 of the screw, so as to fasten together the screw 1 and the anchor body 4 for drilling into the wall. The layer of adhesive 12 is designed to break when a predetermined torque $C_0$, applied between the screw 1 and the anchor body 4, is exceeded, said torque being adjusted depending on the mechanical properties of the wall and the elements forming the anchor body. In particular, the predetermined torque $C_0$ must be greater than the torque needed to drill the wall with the hole saw 9 and less than the torque beyond which the anti-rotation fins 59 no longer perform their function of rotationally locking the anchor body with respect to the wall. Following breakage of the layer of adhesive 12, screwing of the screw 1 into the nut 8 causes the nut to move up along the shank 3 of the screw in the direction of the flange 55 and the deformation of the expansion portion 6,7. As a variant, the fastening, detachable when a predetermined torque $C_0$ between the screw 1 and the anchor body 4 is exceeded, may be obtained by means other than a layer of adhesive, in particular a frangible connection.

In the fifth embodiment shown in FIGS. 11 to 15, the anchor 10 differs from that of the fourth embodiment solely in that the rotation locking means for rotationally locking the anchor body 4 with respect to the wall 40 are not fins 59 for anchoring in the material of the wall, but are raised motifs 52 which are provided on the face 55B of the flange 55 directed opposite from the head 2 of the screw and are designed to cooperate with complementary raised motifs 152 provided on a part 150 to be fixed onto the wall. In the example shown in FIGS. 11 to 15, the part to be fixed onto the wall 40 is a bracket 150, one arm 154 of which is intended to rest against the wall. The arm 154 of the bracket 150 comprises two holes 151, the rotation locking motifs 152 being provided around each hole 151 on one face 150A of the arm 154 intended to be arranged facing the face 55B of the flange 55. Advantageously, the arm 154 comprises, on its face 150B resting against the wall 40, claws 153 for provisionally fixing in position the bracket with respect to the wall 40. The holes 151 may be used as centering elements during drilling of the wall 40 with the hole saw 9. In this case, it is not required for the end 33 of the screw to form a centering tip.

In a particularly advantageous manner, the anchor 10 of the fifth embodiment allows the bracket 150 to be fixed onto the wall in a single step at each fixing point by simply driving the screw 1 in rotation using a conventional screwing tool. More precisely, fixing of the bracket 150 onto the wall 40 by means of the anchor 10 is performed by driving the screw 1 in rotation in the conventional screwing direction, by the action of a tool inserted in the recess 21 provided for this purpose in the head 2 of the screw. Initially the torque applied between the screw 1 and the anchor body 4 is less than the predetermined torque $C_0$ such that the screw and the anchor body are kinematically connected together. Rotation of the screw 1 therefore causes rotation of the hole saw 9 and, by bringing the hole saw 9 into contact with the wall 40 via a hole 151 in the arm 154 of the bracket—the latter being provisionally fixed in position against the wall 40 by means of the claws 153—a hole 41 is made in the wall 40 and the anchor body 4 inserted therein with its expansion portion 6, 7 in its initial insertion state.

When the face 55B of the flange 55 comes into contact against the face 150A of the bracket arm 154, the rotation locking motifs 52 provided on the flange engage with the complementary motifs 152 of the bracket so that the anchor body 4 is rotationally locked with respect to the wall 40. In this configuration, the expansion portion formed by the membrane 6 and the casing 7 projects from the rear face 40B of the wall, as can be seen in FIG. 11. The screw 1 and the anchor body 4 remain fastened together until a torque greater than or equal to the predetermined torque $C_0$ is reached. With continued rotational operation of the screw 1 and therefore an increase in the torque, the screw 1 is separated from the anchor body 4, this causing screwing of the screw into the nut 8 and advancing of the nut 8 towards the flange 55. This results in deformation of the expansion portion formed by the membrane 6 and the casing 7 from the initial insertion state to a deployed state, thus locking the anchor 10 in the wall 40, the part 150 thus being fixed in position on the wall between the wall 40 and the flange 55.

Figure 16:
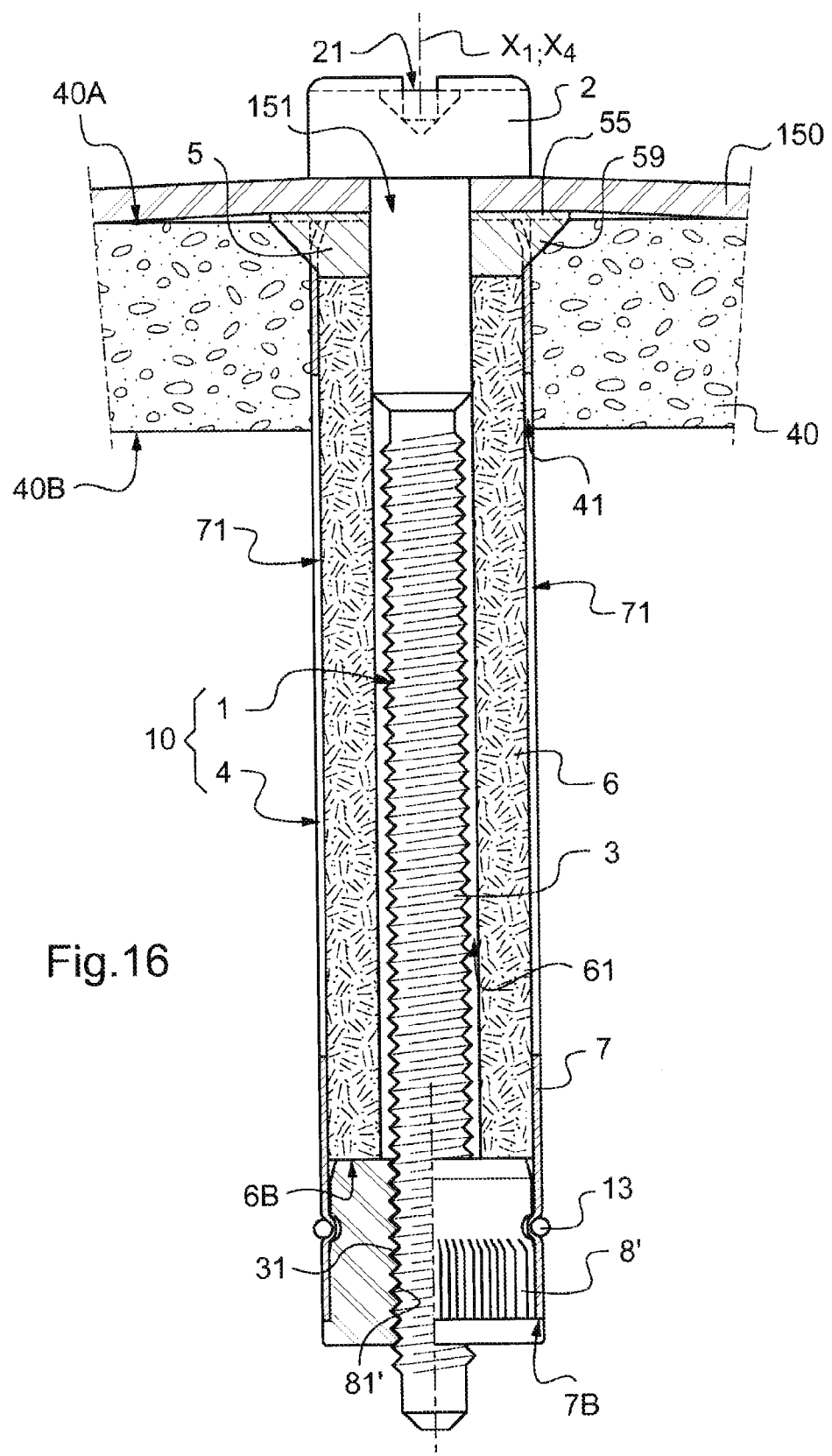
FIG. 16 is a cross-section similar to that of FIG. 2, for an anchor according to a sixth embodiment of the invention.

In the sixth embodiment shown in FIG. 16, the anchor body 4 comprises a metal sleeve 8' bearing against the end 6B of the membrane 6. The sleeve 8' is translationally and rotationally locked in position with respect to the membrane 6 and the casing 7, by means of crimping of the casing 7 around the sleeve 8'. A crimping ring 13 is moreover provided for securing the fastening between the sleeve 8' and the casing 7. The sleeve 8' has an inner tapped portion 81' complementing the thread 31 of the screw and is designed to move in the direction of the flange 55, by deforming the expansion portion 6, 7, under the action of screwing the screw 1.

Figure 17:
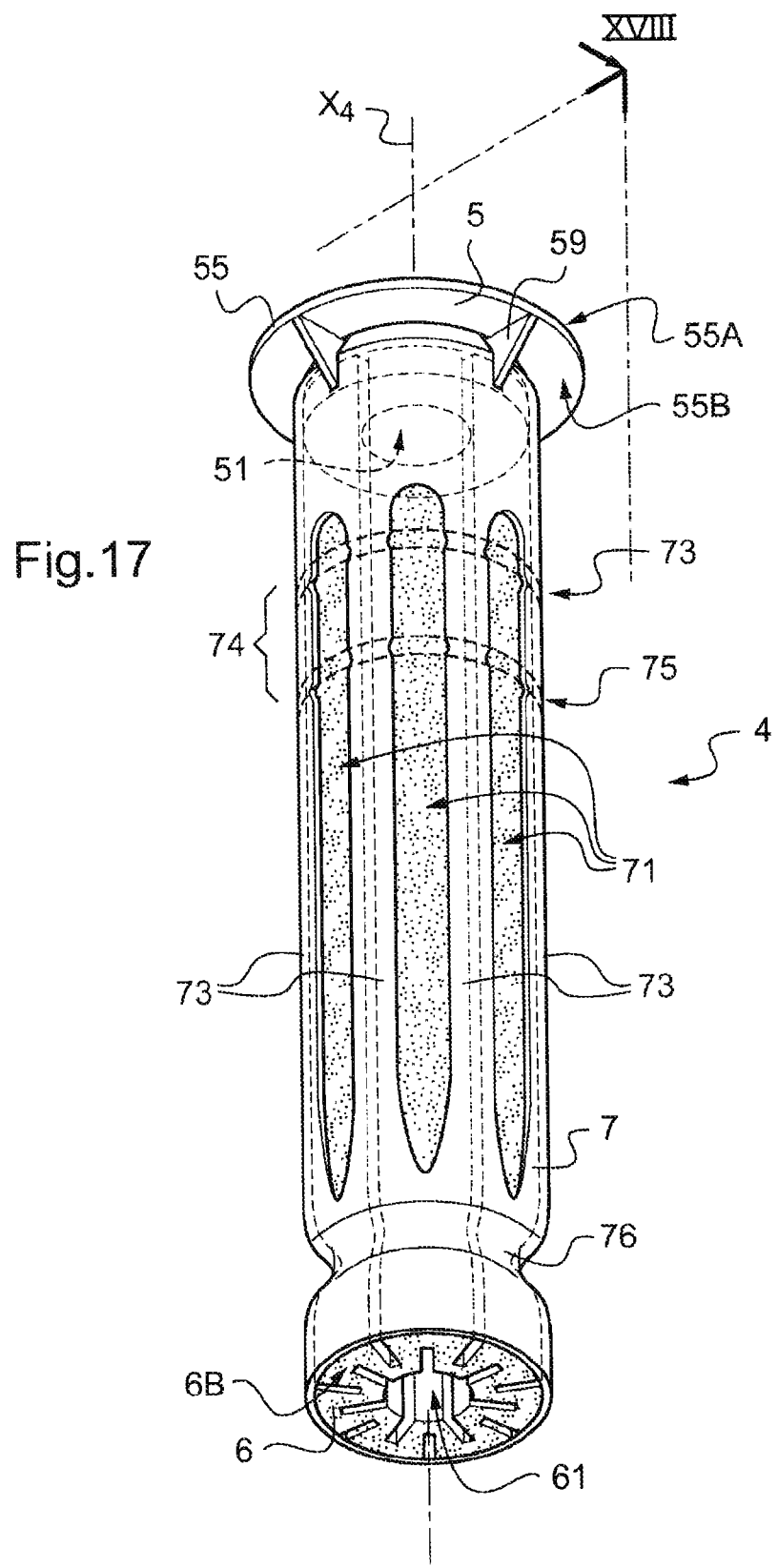
FIG. 17 is a perspective view, similar to that of FIG. 1, of the body of an anchor according to a seventh embodiment of the invention.
Figure 18:
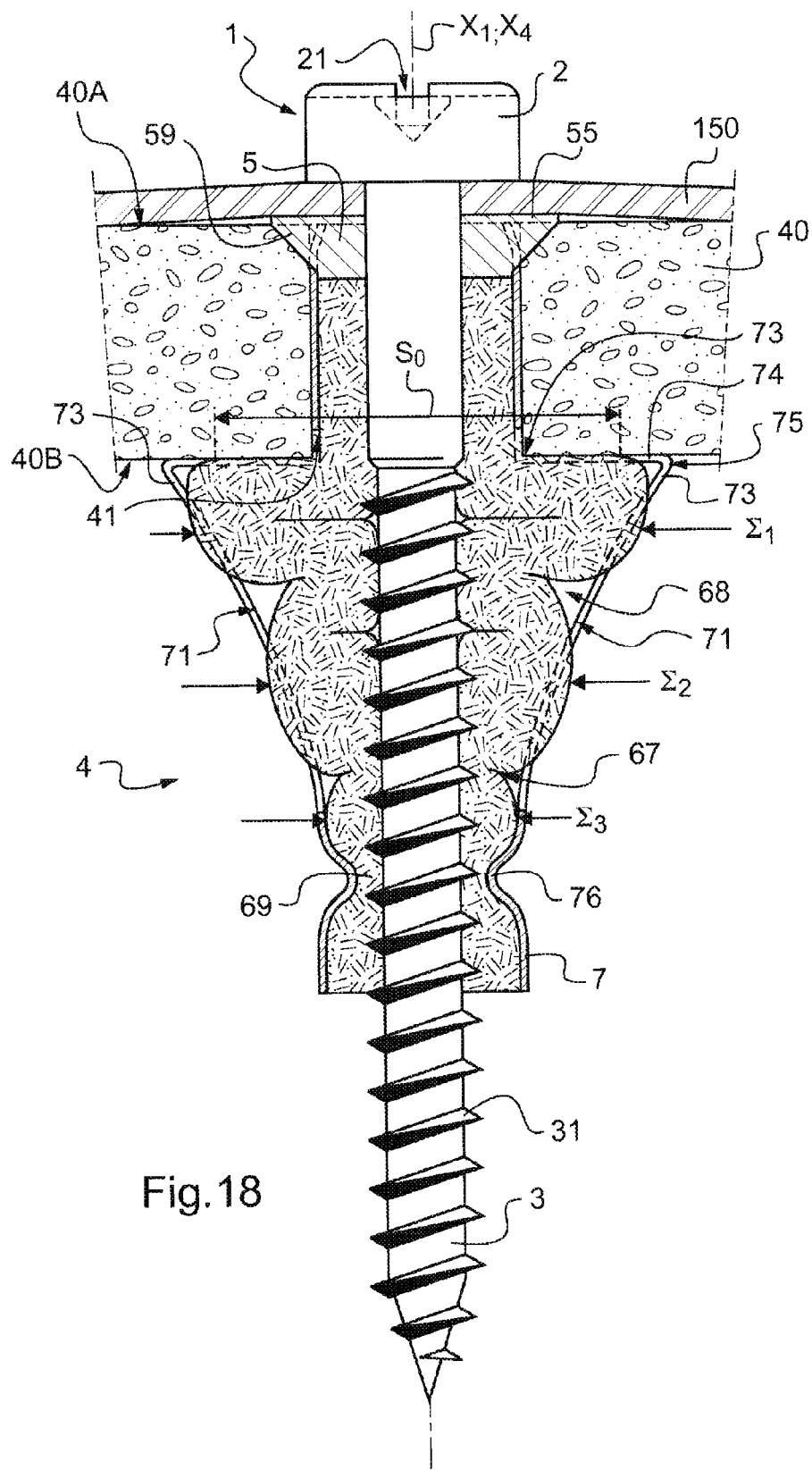
FIG. 18 is a cross-section along the plane XVIII shown in FIG. 17, in the configuration where the anchor is mounted in a hole in a wall, in the deployed state of the expansion portion of the anchor body.

The anchor according to the seventh embodiment shown in FIGS. 17 and 18 differs from that of the first embodiment solely as regards its casing 7 which comprises prefolds in the region of the apertures 71. These prefolds are intended to guide deformation of the casing and define the area of the contact surface $S_0$. More precisely, as shown in FIG. 12, the casing comprises two circumferential folding zones 73 and 75 which delimit between them a portion 74 intended to bear against the rear face 40B of the wall in the deployed state of the expansion portion 6, 7. Thus, in the deployed state shown in FIG. 18, the casing 7 has a substantially frustoconical form, the large base of which is defined by the portion 74.

The eighth embodiment shown in FIGS. 19 and 20 shows a variation of the structure for the casing 7 of the anchor body 4. In this embodiment, the end 7B of the casing is formed by a nut 8 having, extending therefrom, a metal tube, a peripheral wall of which is folded in the manner of a fan along folding lines 72. As shown in FIG. 20, the metal tube is designed to splay, starting from the nut 8, by means of separation of the folding lines 72. In this embodiment, the casing also comprises a series of teeth 91 which are circumferentially distributed on the end 7B, so that the anchor 10 is self-drilling, in a similar manner to the hole saw 9 of the fourth and fifth embodiments.

The invention is not limited to the examples described and shown. In particular a piercing element such as that described in the fourth and fifth embodiments may be fitted onto any anchor according to the invention, and in particular onto the anchors of the other embodiments described above. Moreover, the expansion portion may comprise solely a membrane, without it necessarily being combined with a casing. The combination of a membrane and a casing is, however, advantageous for multiplying the means for guiding the deformation of the expansion portion and ensuring that the load-bearing section at the rear of the wall is, in the deployed state of the expansion portion, generally decreasing from the contact surface facing the wall towards the nut-forming portion.

What is claimed:

1. An expansion anchor for fixing in a wall, comprising:
a screw including a head and a shank including a thread;
an anchor body configured to receive the shank of the screw, the anchor body comprising:
a flange configured to be directed towards the head of the screw,
a nut-forming portion configured to cooperate with the thread of the screw,
a deformable expansion portion between the flange and the nut-forming portion;
the nut-forming portion configured to advance in a direction of the flange, by deforming the expansion portion from an initial state for insertion in a wall to a deployed state, under action of screwing the screw in the nut-forming portion,
wherein the expansion portion comprises a tubular membrane made of polymer material, including an internal bore to receive the shank of the screw, each of inner and outer peripheral surfaces of the membrane including a plurality of circumferentially distributed and radially open longitudinal grooves that increase a circumferential surface area of the membrane; and
wherein, in a configuration that the anchor is mounted inside a hole in a wall, with the flange bearing against a first face of the wall and the expansion portion projecting from a second face of the wall, the expansion portion in the deployed state forms a continuous contact surface facing the second face of the wall and includes a load-bearing section, transversely with respect to the axis of the screw, which is generally decreasing from the contact surface towards the nut-forming portion.

2. An anchor as claimed in claim 1, wherein the load-bearing section of the expansion portion in the deployed state is centered on the axis of the screw.

3. An anchor as claimed in claim 1, further comprising guiding elements for guiding the deformation of the expansion portion from the initial state to the deployed state, to ensure the load-bearing section of the expansion portion in the deployed state is generally decreasing from the contact surface towards the nut-forming portion.

4. An anchor as claimed in claim 3, wherein the guiding elements for guiding the deformation of the expansion portion comprise at least two circumferential joining zones in which at least some longitudinal grooves of the membrane are closed, longitudinal dimension of each section defined between two successive joining zones decreasing from the flange towards the nut-forming portion.

5. An anchor as claimed in claim 3, wherein the guiding elements for guiding the deformation of the expansion portion comprise a perimeter of the membrane decreasing from the flange towards the nut-forming portion.

6. An anchor as claimed in claim 3, wherein the guiding elements for guiding the deformation of the expansion portion comprise longitudinal motifs of a deformable casing positioned around the membrane to confine the deformation of the membrane, the casing being connected to the nut-forming portion, the longitudinal motifs of the casing being configured to guide the deformation of the casing such that it flares outwardly starting from the nut-forming portion.

7. An anchor as claimed in claim 3, wherein the guiding elements for guiding the deformation of the expansion portion comprise two circumferential folding zones of a deformable casing positioned around the membrane to confine the deformation of the membrane, the casing being connected to the nut-forming portion, the two circumferential folding zones of the casing defining between them a portion for bearing against the second face of the wall in the deployed state of the expansion portion.

8. An anchor as claimed in claim 1, wherein the membrane is made of an elastomeric material having a more rigid behavior when its deformation increases.

9. An anchor as claimed in claim 1, wherein the expansion portion comprises a deformable casing positioned around the membrane to confine the deformation of the membrane, the casing being connected to the nut-forming portion.

10. An anchor as claimed in claim 9, wherein the casing is made of metallic material.

11. An anchor as claimed in claim 1, wherein the nut-forming portion is a portion of the membrane that can be tapped by the screw.

12. An anchor as claimed in claim 1, wherein the nut-forming portion is a separately mounted part attached to the expansion portion.

13. An anchor as claimed in claim 1, wherein the expansion portion and the nut-forming portion are fastened together by crimping.

14. An anchor as claimed in claim 1, further comprising rotation locking elements for rotationally locking the anchor body with respect to the wall in a position that the flange bears against the wall or against a part to be fixed to the wall.

15. An anchor as claimed in claim 1, wherein the anchor body comprises a piercing element at its opposite end from the flange.

16. An anchor as claimed in claim 15, further comprising fastening elements between the screw and the anchor body that are detachable for a torque, applied between the screw and the anchor body, greater than or equal to a predetermined torque.

17. Use of an anchor as claimed in claim 1 for fixing in a thin wall, or a construction panel, a plasterboard, a cement board, a chipboard, a wooden panel, a hollow clay block, a composite panel formed by assembly of a plasterboard and an insulating panel made of expanded polystyrene or polyurethane foam.

18. Use of an anchor as claimed in claim 1 for fixing in a plasterboard having a volumetric core density less than 650 kg/m$^3$, or less than 550 kg/m$^3$.

19. An assembly comprising a plasterboard having a volumetric core density less than 650 kg/m$^3$, or less than 550 kg/m$^3$, and an anchor as claimed in claim 1, which is fixed or configured to be fixed in the plasterboard.

* * * * *